US008933786B2

(12) United States Patent
Yoon et al.

(10) Patent No.: US 8,933,786 B2
(45) Date of Patent: Jan. 13, 2015

(54) RFID TAG DEVICE AND METHOD OF RECOGNIZING THE SAME

(75) Inventors: Ho Sun Yoon, Daejeon (KR); Ho Yong Ryu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 425 days.

(21) Appl. No.: 13/331,052

(22) Filed: Dec. 20, 2011

(65) Prior Publication Data

US 2012/0161936 A1 Jun. 28, 2012

(30) Foreign Application Priority Data

Dec. 22, 2010 (KR) .......................... 10-210-0132275

(51) Int. Cl.
*H04Q 5/22* (2006.01)
*G08B 13/14* (2006.01)
*H04L 9/32* (2006.01)
*H04Q 1/30* (2006.01)
*G06Q 20/00* (2012.01)
*G06F 12/14* (2006.01)
*G06K 19/073* (2006.01)

(52) U.S. Cl.
CPC ................................ *G06K 19/07309* (2013.01)
USPC ....... 340/10.1; 340/5.6; 340/5.86; 340/572.1; 340/534; 380/282; 713/189; 713/193; 713/168; 705/67

(58) Field of Classification Search
CPC .......... G06K 19/07309; G06K 19/073; H04W 12/06; H04L 9/3236; H04L 9/3273
USPC .......... 340/10.1–10.6, 572.1–572.9, 534, 5.6, 340/5.65, 5.26, 5.8, 5.2, 5.86; 713/189, 713/193, 168, 200; 380/282; 235/472.02
See application file for complete search history.

(56) References Cited

U.S. PATENT DOCUMENTS

| 7,661,132 B2 * | 2/2010 | Ohkubo et al. .................. 726/18 |
| 7,791,451 B2 * | 9/2010 | Lei et al. ......................... 340/5.2 |
| 8,344,853 B1 * | 1/2013 | Warner et al. ................. 340/10.1 |
| 8,359,480 B2 * | 1/2013 | Poovendran et al. ......... 713/189 |
| 8,588,743 B2 * | 11/2013 | Yamashita et al. ............ 455/411 |
| 2010/0161999 A1 | 6/2010 | Poovendran et al. |

FOREIGN PATENT DOCUMENTS

KR 10-2007-0113401 11/2007

OTHER PUBLICATIONS

Chiu C Tan et al., *Secure and Serverless RFID Authentication and Search Protocols*, IEEE Transactions on Wireless Communications, vol. 7, No. 4 pp. 1400-1407, Apr. 2008.
Lars Kulseng et al., *Lightweight Secure Search Protocols for Low-cost RFID Systems*, IEEE International Conference on Distributed Computing Systems pp. 40-48, Feb. 2010.

* cited by examiner

*Primary Examiner* — Daniel Wu
*Assistant Examiner* — Mancil Littlejohn, Jr.
(74) *Attorney, Agent, or Firm* — Staas & Halsey LLP (57) ABSTRACT

Provided is a radio frequency identification (RFID) tag device. The RFID tag device includes memory which stores ID information and a second count value, and a certification unit which performs a certification process according to a keyed hash value received from the outside and a result of a comparison between first and second count values received from the outside, and adjusts the second count value.

14 Claims, 6 Drawing Sheets

RFID TAG DEVICE AND METHOD OF RECOGNIZING THE SAME

CROSS-REFERENCE TO RELATED APPLICATIONS

This U.S. non-provisional patent application claims priority under 35 U.S.C. §119 of Korean Patent Application No. 10-2010-0132275, filed on Dec. 22, 2010, the entire contents of which are hereby incorporated by reference.

BACKGROUND OF THE INVENTION

The present invention disclosed herein relates to a radio frequency identification (RFID) system, and more particularly, to an RFID system including a verification device and RFID tag devices.

The RFID system relates to a technology for processing information on objects by using small semiconductor chips. The RFID system is a noncontact-type recognition system in which the verification device recognizes the RFID tag device, and processes information on an object to which the RFID tag device is attached by using a radio frequency. For protecting the information which is exchanged in the RFID system being included in the radio frequency, it is important to develop a security protocol.

It is needed to develop a technology for providing safety and reliability to a user and a developer from the design phase before implementing the security protocol. For instance, an unauthorized person may illegally acquire information, particularly private information, from the RFID tag.

It is a widely used method to update a certification key whenever the RFID tag device is searched for in order to improve safety of the search for the RFID tag device. For updating the certification key, information to be shared by the RFID tag device and the verification device is needed, and this information should be synchronized. In the case where the information shared by the RFID tag device and the verification device is different from each other, reliability of the RFID system is not guaranteed.

SUMMARY OF THE INVENTION

The present invention provides an RFID tag device capable of preventing leakage of communication information from an RFID system, and a method of recognizing the RFID tag device.

Embodiments of the present invention provide RFID tag devices including a reception unit configured to receive an input message including a keyed hash value and a first count value from the outside; a memory configured to store identification (ID) information and a second count value; a certification unit configured to perform a certification process according to the keyed hash value received from the outside and a result of a comparison between the first and second count values, and adjust the second count value; a keyed hash value generating unit configured to calculate a keyed hash value by using the adjusted second count value and the ID information; and a transmission unit configured to transmit a response message by outputting the calculated keyed hash value and the adjusted second count value.

In some embodiments, the reception unit may receive the first count value which increases whenever the input message is received, and the certification unit may certify the input message when the first count value is larger than the second count value.

In other embodiments, the certification unit may adjust the second count value by making the second count value equal to the first count value according to the result of the comparison.

In still other embodiments, the keyed hash value generating unit may calculate a response key value according to the adjusted second count value and the ID information, and calculate the keyed hash value by using the response key value.

In other embodiments of the present invention, methods for recognizing an RFID tag device include generating a keyed hash value by changing a first count value and then by using a call key value calculated according to the changed first count value, and outputting the keyed hash value generated by using the call key value and the changed first count value as a call message; certifying the call message according to the keyed hash value generated by using the call key value and a result of a comparison between the changed first count value and a second count value, and adjusting the second count value; calculating a response key value according to the adjusted second count value, generating a keyed hash value by using the response key value, and outputting the keyed hash value generated by using the response key value and the adjusted second count value as a response message; and recognizing the RFID tag device according to the response message.

In some embodiments, the outputting of the call message may include calculating the call key value according to the first count value after increasing the first count value, and outputting the keyed hash value generated by using the call key value and the increased count value.

In other embodiments, the adjusting of the second count value may include certifying the call message when the increased first count value is larger than the second count value.

In still other embodiments, the adjusting of the second count value may include making the second count value equal to the increased first count value when the call message is certified.

In even other embodiments, the recognizing of the RFID tag device may be accomplished when the keyed hash value generated by using the response key value and the keyed hash value generated by using the call key value match.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art. Like reference numerals refer to like elements throughout.

In the specification, when it is described that a certain part is "connected" to another part, it should be understood that the former may be "directly connected" to the latter, or "electrically connected" to the latter through an intervening part. In the specification, when it is described that a certain part "includes" certain elements, the former may further include other elements unless otherwise specified.

Figure 1:
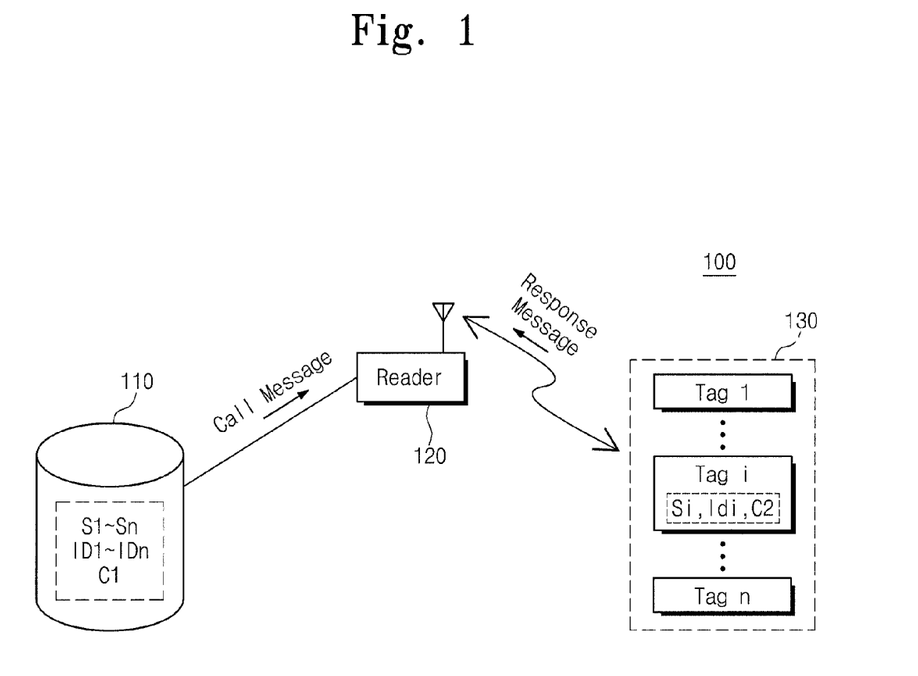
FIG. 1 illustrates an RFID system according to an embodiment of the present invention.

FIG. 1 illustrates a radio frequency identification (RFID) system 100 according to an embodiment of the present invention. Referring to FIG. 1, the RFID system 100 includes a verifier 110, a reader 120, and a plurality of RFID tag devices 130. The verifier 110 stores security values S1 to Sn which respectively correspond to the RFID tag devices 130, IDs ID1 to IDn which respectively correspond to the RFID tag devices 130, and a first count value C1. Exemplarily, the verifier 110 includes a database for storing the security values S1 to Sn, the IDs ID1 to IDn, and the count value C1. The verifier 110 may manage information relates to the RFID tag devices 130, and search for the RFID tag devices 130.

The reader 120 transmits information received from the verifier 120 to the RFID tag devices 130. The reader 120 and the verifier 110 communicate with each other through a safe security channel. The reader 120 serves to read information of the RFID tag devices 130, and may communicate with the RFID tag devices 130 and the verifier 110. For instance, the reader 120 broadcasts a signal received from the verifier 110 to the RFID tag devices 130.

Each of the RFID tag devices 130 stores a security value Si, an ID IDi, and a second count value C2 (where, i is an integer). Each of the RFID tag devices 130 performs a certification process on a received message. That is, each of the RFID tag devices determines whether the received message is transmitted from the reader 120, and calls each of the RFID tag devices. When the certification process is completed, the RFID tag devices 130 transmit response messages.

The security values S1 to Sn are predetermined confidential information between the verifier 110 and the RFID tag devices 130. First to nth security values S1 to Sn are respectively stored in the RFID tag devices 130, and the first to nth security values S1 to Sn are stored in the verifier 110. The security values S1 to Sn are not published outside of the RFID system 100.

The IDs ID1 to IDn represent information on items to which RFID tag devices 130 are respectively attached. For instance, the IDs ID1 to IDn may represent countries and companies in which the items were produced, and kinds of the items. Exemplarily, the IDs ID1 to IDn are published to the outside.

Figure 2:
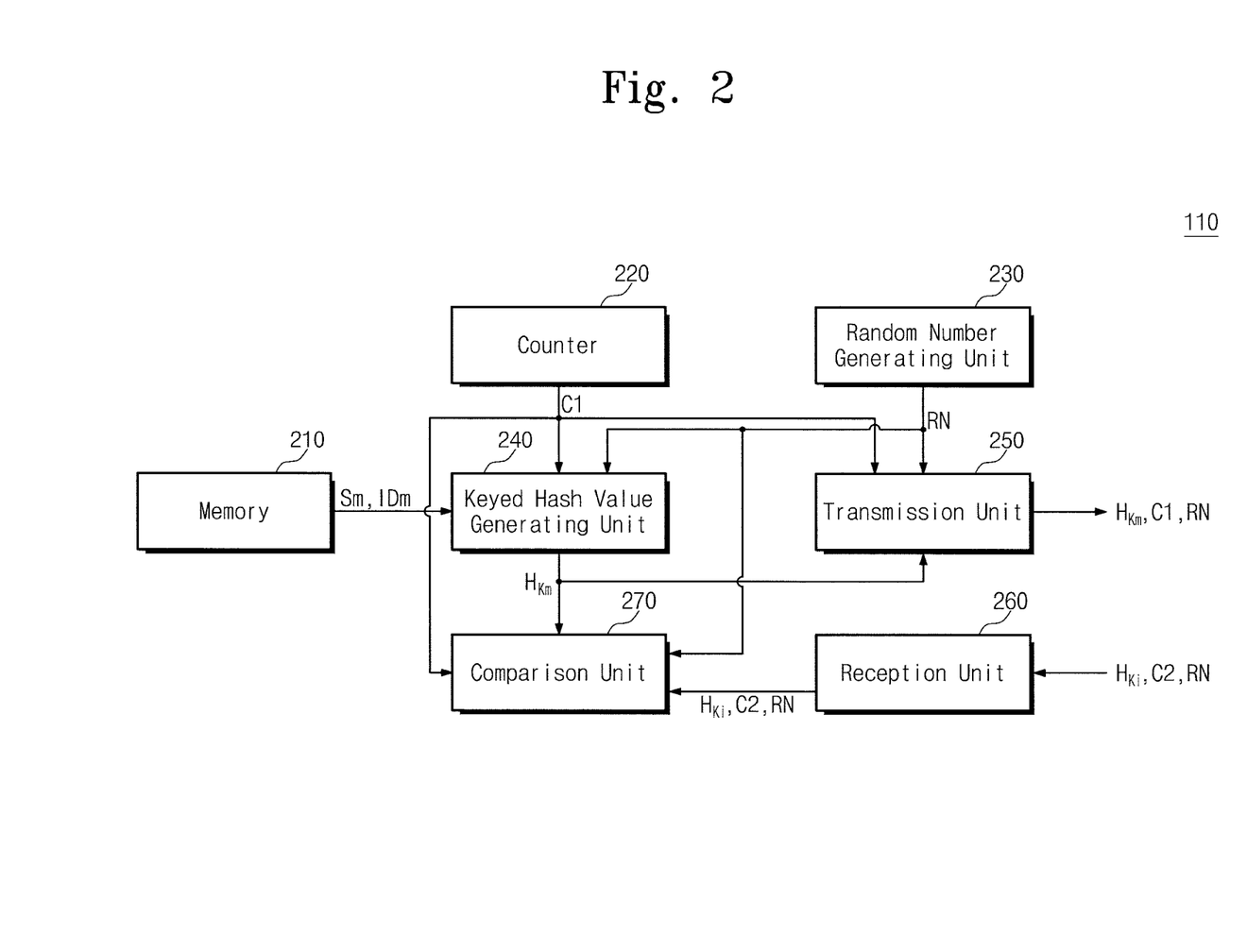
FIG. 2 is a block diagram illustrating a verifier according to an embodiment of the present invention.

FIG. 2 is a block diagram illustrating the verifier 110 according to an embodiment of the present invention. Referring to FIG. 2, the verifier 110 includes a memory 210, a counter 220, a random number generating unit 230, a keyed hash value generating unit 240, a transmission unit 250, a reception unit 260, and a comparison unit 270.

The memory 210 stores the security values S1 to Sn (refer to FIG. 1) and IDs ID1 to IDn (refer to FIG. 1). In addition, the memory 210 provides a security value Sm and an ID IDm to the keyed hash value generating unit 240 (where, m is an integer).

The counter 220 stores the first count value C1. In the case of searching for one of the RFID tag devices 130 (refer to FIG. 1), the counter 220 increases the first count value C1 by 1. Then, the counter 220 provides the increased first counter value C1 to the keyed hash value generating unit 240, the transmission unit 250, and the comparison unit 270.

The random number generating unit 230 generates a random number RN. The random number generating unit 230 provides the generated random number RN to the keyed hash value generating unit 240, the transmission unit 250, and the comparison unit 270.

The keyed hash value generating unit 240 receives the security value Sm and the ID IDm from the memory 210, and receives the first count value C1 from the counter 220. The keyed hash value generating unit 240 calculates a call key value by using the security value Sm, the ID IDm, and the first count value C1. For instance, the keyed hash value generating unit 240 uses the security value Sm, the ID IDm, and the first count value C1 as input values of a hash function to calculate the call key value. And, the keyed hash value generating unit 240 generates a keyed hash value (not illustrated) by using the call key value.

Figure 3:
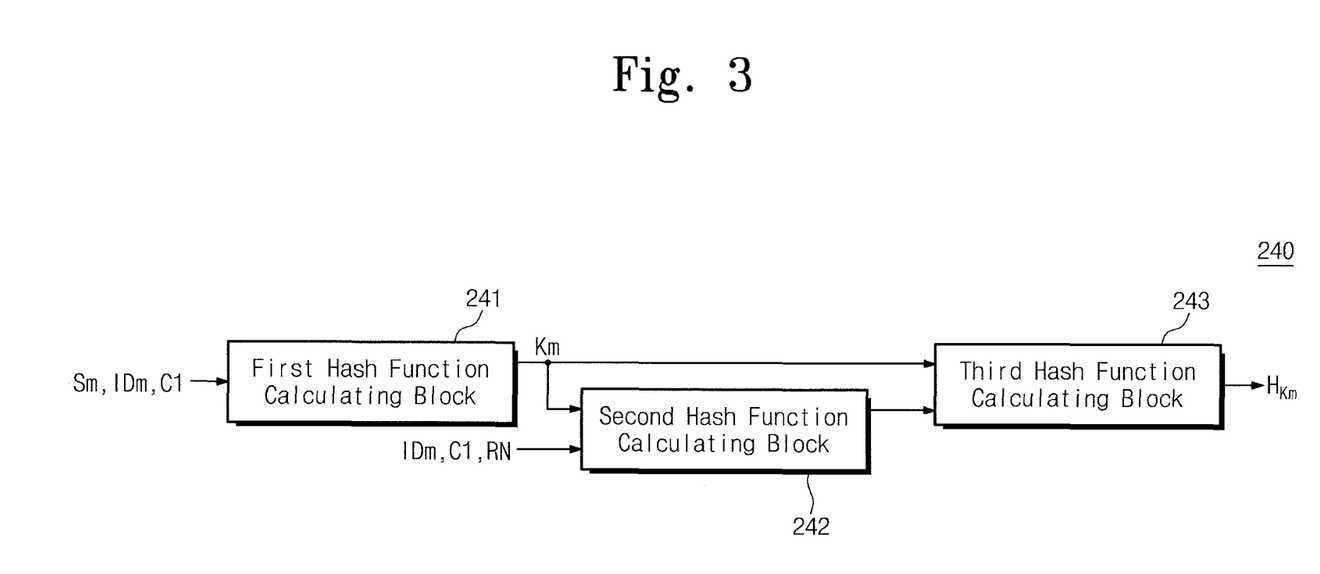
FIG. 3 is a block diagram illustrating a keyed hash value generating unit.

The hash function is a kind of an encryption function, and is used for generating an output value having a fixed data amount from an input value having a variable data amount. FIG. 3 exemplarily illustrates the keyed hash value generating unit 240. A first hash function calculating block 241 receives the security value Sm, the ID IDm, and the first count value C1, and outputs a call key value Km. Exemplarily, the security value Sm, the ID IDm, and the first count value C1 are inputted as a string of data into the first hash function calculating block 241. The call key value Km is used as input values of second and third hash function calculating blocks 242 and 243.

The second and third hash function calculating blocks 242 and 243 generate the keyed hash value by using the call key value Km. FIG. 3 exemplarily illustrates that a hash operation using the call key value Km is performed twice to generate the keyed hash value.

The second hash function calculating block 242 receives the ID IDm, the first count value C1, and the random number RN. The second hash function calculating block 242 receives the call key value Km from the first hash function calculating block 241. The second hash function calculating block 242 uses the ID IDm, the first count value C1, the random number RN, and the call key value Km as input values of a hash function. The ID IDm, the first count value C1, the random number RN, and the call key value Km may be data constituting a single string. The third hash function calculating block 243 receives an output value of the second hash function calculating block 242. And, the third hash function calculating block 243 receives the call key value Km. The third hash function calculating block 243 receives the output value of the second hash function calculating block 242 and the call key value Km, and performs a hash operation to generate a keyed hash value $H_{Km}$.

The keyed hash value generating unit 240 may temporarily store the generated keyed hash value $H_{Km}$. For instance, the third hash function calculating block 243 may include a temporary buffer (not illustrated) for storing the keyed hash value $H_{Km}$. The temporarily stored keyed hash value $H_{Km}$ is provided to the comparison unit 270.

The transmission unit 250 transmits the first count value C1, the keyed hash value $H_{Km}$, and the random number RN to the reader 120 (refer to FIG. 1). The reader 120 transmits the received first count value C1, keyed hash value $H_{Km}$, and random number RN to the RFID tag devices 130. Exemplarily, the first count value C1 and the keyed hash value $H_{Km}$ constitute a call message.

The reception unit 260 receives the second count value C2, a keyed hash value $H_{Ki}$, and the random number RN. The reception unit 260 transfers the second count value C2, the keyed hash value $H_{Ki}$, and the random number RN to the comparison unit 270. The second count value C2 and the keyed hash value $H_{Ki}$ constitute a response message received from one of the RFID tag devices 130.

The comparison unit 270 receives the first count value C1 and the random number RN from the counter 220 and the random number generating unit 230 respectively. The comparison unit 270 receives the keyed hash value $H_{Ki}$ and the second count value C2.

The comparison unit 270 compares the keyed hash values $H_{Km}$ and $H_{Ki}$ with each other. When the keyed hash values $H_{Km}$ and $H_{Ki}$ match, it is determined whether the random number RN received from the reception unit 260 and the random number RN received from the random number generating unit 230 match. When the random number RN received from the reception unit 260 and the random number RN received from the random number generating unit 230 match, the first and second count values C1 and C2 are compared with each other. When the first and second count values C1 and C2 match, the comparison unit 270 determines that the RFID tag device corresponding to the ID IDm has been found.

Figure 4:
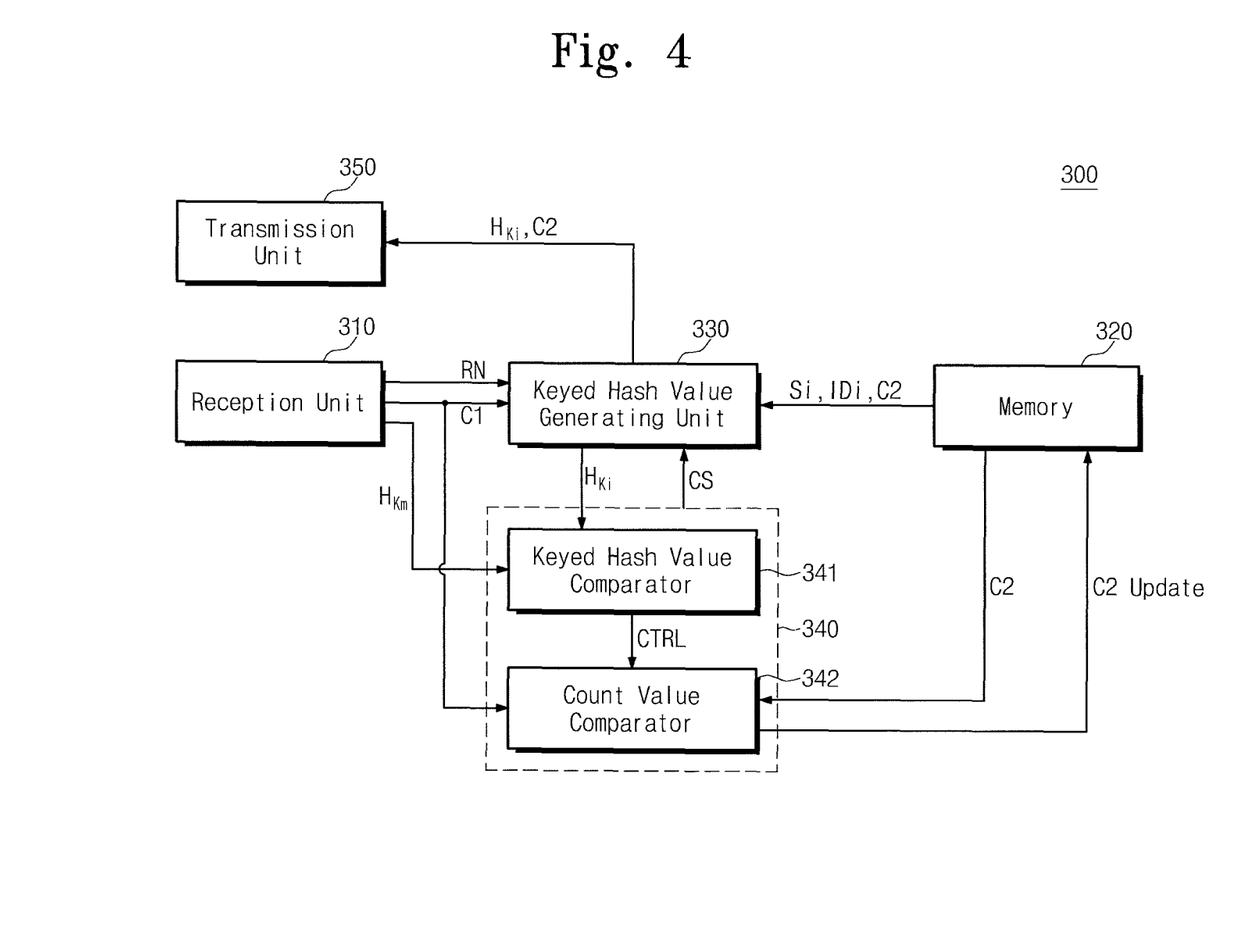
FIG. 4 is a block diagram illustrating one of RFID tag devices according to an embodiment of the present invention.

FIG. 4 is a block diagram illustrating one of the RFID tag devices 130 (refer to FIG. 1) according to an embodiment of the present invention. Referring to FIG. 4, an RFID tag device 300 includes a reception unit 310, a keyed hash value generating unit 330, a memory 320, a certification unit 340, and a transmission unit 350. The reception unit 310 receives the random number RN, the first count value C1, and the keyed hash value $H_{Km}$. The random number RN, the first count value C1, and the keyed hash value $H_{Km}$ are transmitted from the reader 120. The first count value C1 and the keyed hash value $H_{Km}$ constitute a call message.

The reception unit 310 transmits the random number RN to the keyed hash value generating unit 330, transmits the first count value C1 to the keyed hash value generating unit 330 and a count value comparator 342, and transmits the keyed hash value $H_{Km}$ to a keyed hash value comparator 341.

The memory 320 stores the security value Si, the ID IDi, and the second count value C2. The RFID tag devices 130 (refer to FIG. 10 have different security values. Also, the RFID tag devices 130 (refer to FIG. 10) have different IDs.

The keyed hash value generating unit 330 receives the security value Si, the ID IDi, and the updated second count value C2 from the memory 320. The keyed hash value generating unit 330 receives the random number RN and the first count value C1 from the reception unit 310.

The keyed hash value generating unit 330 calculates a certification key value (not illustrated) by using the security value Si, the ID IDi, and the first count value C1. And, the keyed hash value generating unit 330 generates the keyed hash value $H_{Ki}$ by using the certification key value. Exemplarily, the certification key value, the ID IDi, the first count value C1, and the random number RN are used as input values of a hash function to generate the keyed hash value $H_{Ki}$. The keyed hash value generating unit 330 generates the keyed hash value $H_{Ki}$ in the same manner as the keyed hash value generating unit 240 described above with reference to FIG. 3.

The certification unit 340 receives the keyed hash value $H_{Km}$ and the first count value C1, and determines whether to transmit a response message. According to an embodiment of the present invention, the certification unit 340 includes the keyed hash value comparator 341 and the count value comparator 342. The keyed hash value comparator 341 compares the keyed hash values $H_{Km}$ and $H_{Ki}$. When the keyed hash values $H_{Km}$ and $H_{Ki}$ are the same, the keyed hash value comparator 341 transmits a control signal CTRL. When the keyed hash values $H_{Km}$ and $H_{Ki}$ are different from each other, the keyed hash value comparator 341 does not transmit the control signal CTRL.

The count value comparator 342 receives the second count value C2 and the keyed hash value $H_{Km}$ respectively from the memory 320 and the reception unit 310. The count value comparator 342 compares the first and second count values C1 and C2 in response to the control signal CTRL. When the first and second count values C1 and C2 are the same, the count value comparator 342 stores the second count value C2, which is adjusted to be equal to the first count value C1, in the memory 320 to update the second count value C2 thereof. Also, the count value comparator 342 generates a certification signal CS to operate the keyed hash value generating unit 330.

That is, in the case where not only the keyed hash values $H_{Km}$ and $H_{Ki}$ are the same but also the first and second count values C1 and C2 are the same, the RFID tag device 300 recognizes that the call message transmitted through the reception unit 310 is for the RFID tag device 300. The RFID tag device 300 certifies that the call message has been received from the reader 120 when the keyed hash values $H_{Km}$ and $H_{Ki}$ are the same and the first and second count values C1 and C2 are the same.

In response to the certification signal CS, the keyed hash value generating unit 330 calculates a response key value (not illustrated) according to the security value Si, the ID IDi, and the adjusted second count value C2. And, the keyed hash value generating unit 330 generates the keyed hash value $H_{Ki}$ by using the response key value. Exemplarily, the keyed hash value generating unit 330 may generate the keyed hash value $H_{Ki}$ by using the response key value, the ID IDi, the random number RN, and the adjusted second count value C2. The generated keyed hash value $H_{Ki}$ is transmitted to the reader 120 (refer to FIG. 1) through the transmission unit 350. Also, the adjusted second count value C2 is transmitted to the reader 120 through the transmission unit 350.

As a result, when the response message is transmitted, the first count value C1 received by the RFID tag device 300 is equal to the adjusted second count value C2 outputted from the RFID tag device 300. And, the keyed hash value $H_{Km}$ received by the RFID tag device 300 is equal to the keyed hash value $H_{Ki}$ outputted from the RFID tag device 300.

Figure 5:
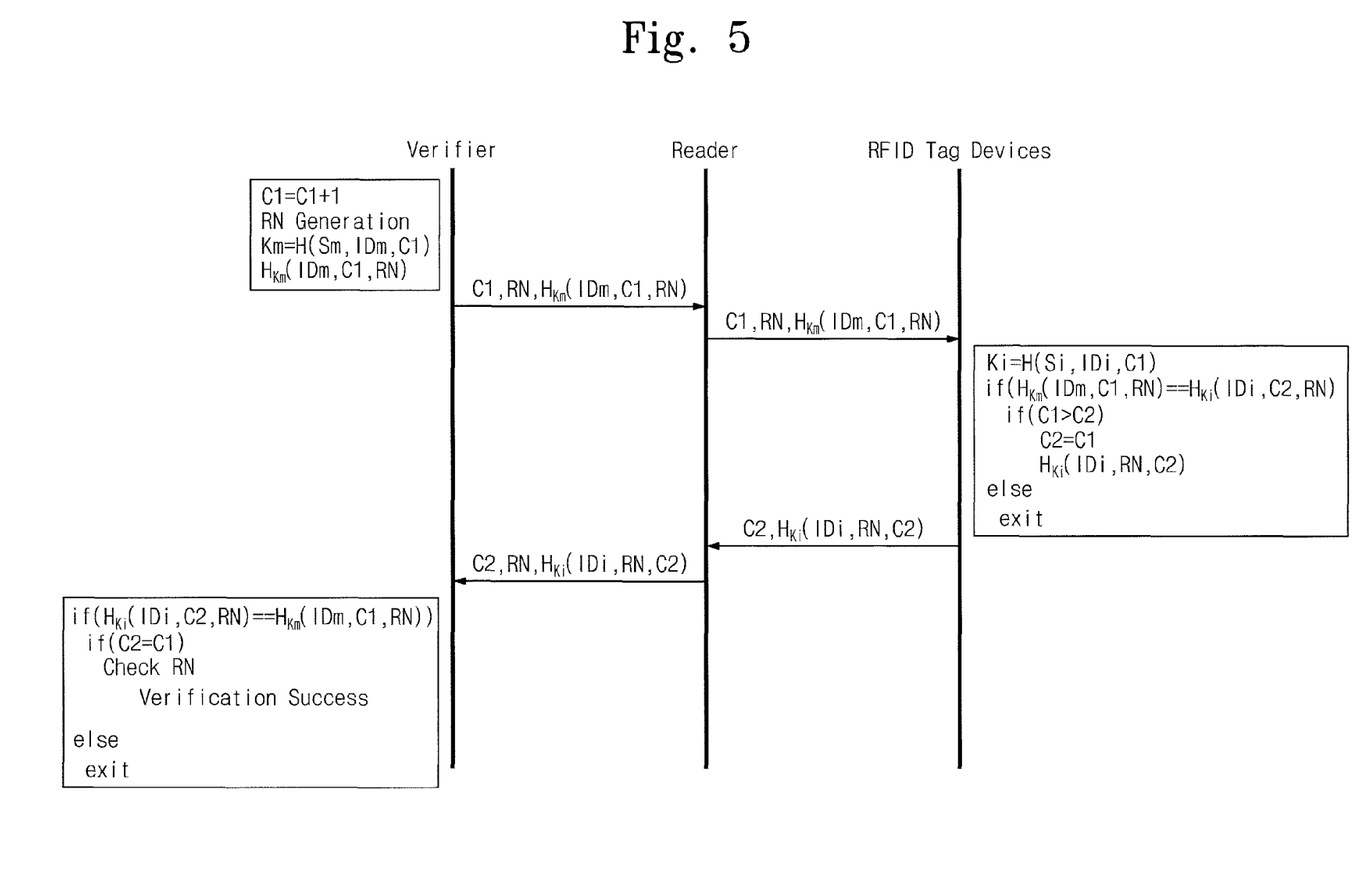
FIG. 5 illustrates a process of recognizing one of RFID tag devices of FIG. 1.

FIG. 5 illustrates a process of recognizing one of the RFID tag devices 130 illustrated in FIG. 1. Referring to FIGS. 1 and 5, when a particular RFID tag device is searched for, the verifier 110 increases the first count value C1, generates the random number RN, and calculates the call key value Km. The call key value Km is calculated by using the security value Sm, the ID IDm, and the first count value C1 as input values of a hash function. The verifier 110 generates the keyed hash value $H_{Km}$ by using the call key value Km, the ID IDm, the first count value C1, and the random number RN. And, the verifier 110 transmits the first count value C1, the random number RN, and the keyed hash value $H_{Km}$ to the reader 120. Herein, the first count value C1, the random number RN, and the keyed hash value $H_{Km}$ are transmitted through a safe security channel not to be leaked to the outside.

The reader 120 transmits the first count value C1, the random number RN, and the keyed hash value $H_{Km}$ to the RFID tag devices 130. The first count value C1, the random number RN, and the keyed hash value $H_{Km}$ constitute the call message transmitted from the reader 120.

Each of the RFID tag devices 130 calculates a certification key value Ki in response to the call message, and generates the keyed hash value $H_{Ki}$ by using the certification key value Ki. The RFID tag device, which has generated the keyed hash value $H_{Ki}$ equal to the keyed hash value $H_{Km}$, compares the first and second count values C1 and C2. The RFID tag device, which has generated the keyed hash value $H_{Ki}$ different from the keyed hash value $H_{Km}$, terminates a process of generating the response message.

The RFID tag device, which stores the second count value C2 smaller than the first count value C1, makes the second count value C2 equal to the first count value C1. The RFID tag device, which stores the second count value C2 smaller than the first count value C1, terminates the process of generating the response message.

The RFID tag device, which has made the second count value C2 equal to the first count value C1, generates the response message. That is, the RFID tag device, which has made the second count value C2 equal to the first count value C1, calculates the response key value Ki by using the security value Si, the ID IDi, and the second count value C2. By using the response key value Ki, the RFID tag device generates the keyed hash value $H_{Ki}$. And, the RFID tag device transmits the second count value C2 and the keyed hash value $H_{Ki}$ as the response message to the reader 120.

The reader 120 transmits the second count value C2 and the keyed hash value $H_{Ki}$ received from one of the RFID tag devices 130 to the verifier 110. Also, the reader 120 transmits the random number RN to the verifier 110. Exemplarily, the reader 120 may temporarily store the random number RN, which has been received from the verifier 110 and will be transmitted to the RFID tag devices 130. And, the reader 120 may transmit the temporarily stored random number RN together with the second count value C2 and the keyed hash value $H_{Ki}$.

The verifier 110 compares the keyed hash values $H_{Ki}$ and $H_{Km}$ in response to the response message. When the keyed hash values $H_{Ki}$ and $H_{Km}$ match, the first and second count values C1 and C2 are compared with each other. Exemplarily, the keyed hash value generating unit 240 (refer to FIG. 2) may calculate the keyed hash value $H_{Ki}$ and temporarily store the keyed hash value $H_{Ki}$ when the call message is generated. When the response message is received, the keyed hash value generating unit 240 provides the keyed hash value $H_{Ki}$ to the comparison unit 270.

When the first and second count values C1 and C2 match, the verifier 110 determines that the RFID tag which corresponds to the security value Sm and ID IDm has been found.

To search for at least one of the RFID tag devices 130, the verifier 110 generates the keyed hash value $H_{Km}$ after increasing the first count value C1 by 1. An initial value of the first count value C1 is equal to or larger than that of the second count value C2. The first count value C1 is always maintained to be equal to or larger than the second count value C2 stored in an arbitrary RFID tag device. When a message is lost between the verifier 110 and the RFID tag devices 130, or when the message is stolen by an attacker, it is not needed to synchronize the first and second count values C1 and C2. Therefore, when the message is lost or stolen by an attacker, information leakage due to data synchronization between the verifier 110 and the RFID tag devices 130 does not occur.

Figure 6:
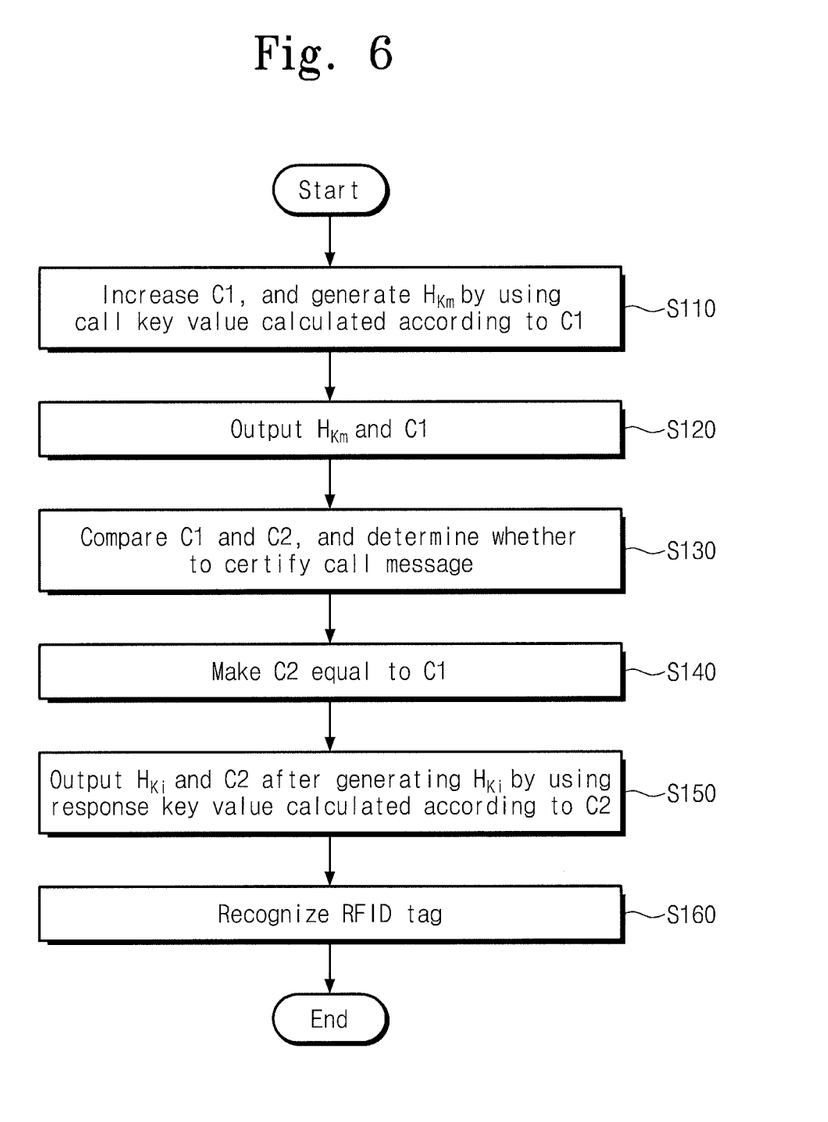
FIG. 6 is a flowchart illustrating a method of recognizing an RFID tag device.

FIG. 6 is a flowchart illustrating a method of recognizing an RFID tag device. In operation S110, the verifier 110 increases the first count value C1, and generates the keyed hash value $H_{Km}$ by using the call key value Km calculated according to the first count value C1. For instance, the verifier 110 calculates the call key value Km by using the security value Sm, the ID IDm, and the first count value C1. And, the verifier 110 generates the keyed hash value $H_{Km}$ by using the call key value Km, the ID IDm, the first count value C1, and the random number RN.

The verifier 110 transmits the generated keyed hash value $H_{Km}$, and the first count value C1 to the reader 120. The keyed hash value $H_{Km}$ and the first count value C1 constitute the call message. Herein, a safe security channel is formed between the verifier 110 and the reader 120. Exemplarily, for improving reliability of the call message, the random number RN may be additionally transmitted together with the keyed hash value $H_{Km}$ and the first count value C1.

In operation S120, the reader 120 outputs the keyed hash value $H_{Km}$ and the first count value C1.

In operation S130, each of the RFID tag devices 130 compares the first and second count values C1 and C2, and determines whether to certify the call message. Each of the RFID tag devices 130 certifies that the received call message is for each of the RFID tag devices 130 when the first count value C1 is larger than the second count value C2.

Exemplarily, each of the RFID tag devices 130 calculates the certification key value Ki by using the received first count value C1, security value Si, and ID IDi in response to the call message, and generates the keyed hash value $H_{Ki}$ by using the certification key value Ki. Each of the RFID tag devices 130 determines whether the generated keyed hash value $H_{Ki}$ and the received keyed hash value $H_{Km}$ match. When the keyed hash values $H_{Ki}$ and $H_{Km}$ match, the first and second count values C1 and C2 are compared with each other. Exemplarily, the operation of comparing the keyed hash values $H_{Ki}$ and $H_{Km}$, and the operation of comparing the first and second count values C1 and C2 may be inversely performed.

In operation S140, the RFID tag device makes the second count value C2 equal to the first count value C1.

In operation S150, the RFID tag device calculates the response key value Ki according to the second count value C2, and generates the keyed hash value $H_{Ki}$ by using the response key value Ki. And, the RFID tag device transmits the generated keyed hash value $H_{Ki}$ and the second count value C2 to the reader 120. The keyed hash value $H_{Ki}$ and the second count value C2 constitute the response message.

In operation S160, according to the keyed hash value $H_{Ki}$ and the second count value C2, the verifier 110 recognizes the RFID tag device corresponding to the security value Sm or ID IDm. Exemplarily, the verifier 110 may further receive the random number RN from the reader 120. When the keyed hash values $H_{Ki}$ and $H_{Km}$ match and the first and second count values C1 and C2 match, the verifier 110 recognizes the RFID tag device corresponding to the security value Sm or ID IDm. Exemplarily, the verifier 110 may further perform a certification operation on the random number RN to recognize the RFID tag device corresponding to the security value Sm or ID IDm.

Whenever a search operation is performed on the RFID tag devices 130, the verifier 110 and the RFID tag devices 130 generate key values, and perform cross-certification by using the generated key values. The first count value is changed whenever the search operation is performed. The generated key values are changed whenever the search operation is performed on the RFID tag devices 130. Therefore, reliability of data exchanged between the verifier 110 and the RFID tag devices 130 is improved.

According to an embodiment of the present invention, it is not required to synchronize the first and second count values C1 and C2 which are respectively used when the call key value Km and the certification key value Ki are generated. The information leakage and deformation of the RFID system 100, which occur due to an external attack during the data synchronization, are prevented.

According to an embodiment of the present invention, whenever the verifier performs a search operation on the RFID tag devices, the first count value is changed, and thus the call key value is changed. Since a new call key value is used whenever the verifier requests for a search for one of the RFID tag devices, leakage of call and response messages is prevented.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A radio frequency identification (RFID) tag device comprising:
    a reception unit configured to receive an input message comprising a keyed hash value and a first count value from the outside;
    a memory configured to store identification (ID) information and a second count value;
    a certification unit configured to perform a certification process according to the keyed hash value received from the outside and a result of a comparison between the first and second count values, and adjust the second count value;
    a keyed hash value generation unit configured to calculate a keyed hash value by using the adjusted second count value and the ID information; and
    a transmission unit configured to transmit a response message by outputting the calculated keyed hash value and the adjusted second count value,
    wherein the keyed hash value calculates a certification key value according to the first count value and the ID information, and generates the keyed hash value by using the certification key value, and the certification unit comprises a keyed hash value comparator configured to compare the keyed hash value generated by using the certification key value and the keyed hash value received from the outside.

2. The RFID tag device of claim 1, wherein the reception unit receives the first count value which is changed whenever the input message is received.

3. The RFID tag device of claim 1, wherein the reception unit receives the first count value which increases whenever the input message is received, and the certification unit certifies the input message when the first count value is larger than the second count value.

4. The RFID tag device of claim 1, wherein the certification unit adjusts the second count value by making the second count value equal to the first count value according to the result of the comparison.

5. The RFID tag device of claim 1, wherein the keyed hash value generation unit calculates a response key value according to the adjusted second count value and the ID information, and calculates the keyed hash value by using the response key value.

6. The RFID tag device of claim 5, wherein the keyed hash value generation unit calculates the response key value by using the adjusted count value and the ID information as input values of a hash function.

7. The RFID tag device of claim 1, wherein the keyed hash value comparator transmits a control signal when the keyed hash value generated by using the certification key value matches the keyed hash value received from the outside, and the certification unit comprises a count value comparator configured to compare the first and second count values in response to the control signal, and adjust the second count value according to a result of the comparison.

8. The RFID tag device of claim 1, wherein the keyed hash value generation unit calculates the certification key value by using the first count value and the ID information as input values of a hash function.

9. A method for recognizing an RFID tag device, comprising:
    generating a keyed hash value by changing a first count value and then using a call key value calculated according to the changed first count value, and outputting the keyed hash value generated by using the call key value and the changed first count value as a call message;
    certifying the call message according to the keyed hash value generated by using the call key value and a result of a comparison between the changed first count value and a second count value, and adjusting the second count value;
    calculating a response key value according to the adjusted second count value, generating a keyed hash value by using the response key value, and outputting the keyed hash value generated by using the response key value and the adjusted second count value as a response message; and
    recognizing the RFID tag device according to the response message.

10. The method of claim 9, wherein the outputting of the call message comprises calculating the call key value according to the first count value after increasing the first count value, and outputting the keyed hash value generated by using the call key value and the increased count value.

11. The method claim 10, wherein the adjusting of the second count value comprises certifying the call message when the increased first count value is larger than the second count value.

12. The method of claim 9, wherein the adjusting of the second count value comprises making the second count value equal to the increased first count value when the call message is certified.

13. The method of claim 9, wherein the adjusting of the second count value comprises generating a keyed hash value by using a certification key value calculated according to the changed first count value, and certifying the call message when the keyed hash value generated by using the certification key value and the keyed hash value generated by using the call key value match.

14. The method of claim 9, wherein the recognizing of the RFID tag device is accomplished when the keyed hash value generated by using the response key value and the keyed hash value generated by using the call key value match.

* * * * *